United States Patent [19]

Marshall

[11] Patent Number: 5,774,571
[45] Date of Patent: Jun. 30, 1998

[54] WRITING INSTRUMENT WITH MULTIPLE SENSORS FOR BIOMETRIC VERIFICATION

[75] Inventor: James Marshall, "Denbrae", Brady Road, Lyminge, Folkestone, Kent, CT18 8EU, United Kingdom

[73] Assignees: Edward W. Ellis; James Marshall, both of Kent, United Kingdom

[21] Appl. No.: 507,859

[22] Filed: Jul. 27, 1995

[30]    Foreign Application Priority Data

Aug. 1, 1994  [GB]  United Kingdom ............ 9415627

[51] Int. Cl.[6] .................................................. G06K 9/00
[52] U.S. Cl. ................................................... 382/119
[58] Field of Search .................................. 382/119, 120, 382/121, 122, 123, 188; 73/865.4; 178/18, 19, 20; 348/161

[56]                References Cited

U.S. PATENT DOCUMENTS

| Re. 34,095 | 10/1992 | Padula et al. ........................ | 178/18 |
|---|---|---|---|
| Re. 35,016 | 8/1995 | Gullman et al. ..................... | 382/119 |
| 4,111,052 | 9/1978 | Sniderman .......................... | 73/432 |
| 4,513,437 | 4/1985 | Chainer et al. ..................... | 382/120 |
| 5,018,208 | 5/1991 | Gladstone ........................... | 382/121 |
| 5,248,855 | 9/1993 | Cambridge .......................... | 178/18 |
| 5,422,959 | 6/1995 | Lee ....................................... | 382/119 |
| 5,587,558 | 12/1996 | Matsushima ........................ | 178/18 |

FOREIGN PATENT DOCUMENTS

| PCT/US93/ 06424 | 8/1993 | WIPO ............................ | G06K 11/18 |
|---|---|---|---|

*Primary Examiner*—David K. Moore
*Assistant Examiner*—Brian P. Werner
*Attorney, Agent, or Firm*—Iandiorio & Teska

[57]                ABSTRACT

Verification apparatus (2) comprising a writing instrument (4) having a body (6) and a grip sensor (8) for sensing grip pressure patterns of a person (10) when the person (10) is holding the writing instrument (4) and executing an intended movement, the verification apparatus (2) being such that the sensed grip pressure patterns are able to be compared with stored grip pressure patterns values for the person (10) in order to obtain information about the person (10) executing the movement with the writing instrument (4) The verification apparatus (2) may include a writing pressure sensor (14), an angle pressure sensor (24) and a gyroscope (32).

4 Claims, 5 Drawing Sheets

WRITING INSTRUMENT WITH MULTIPLE SENSORS FOR BIOMETRIC VERIFICATION

This invention relates to verification apparatus and, more especially, this invention relates to verification apparatus that may be used for a wide variety of purposes such for example as signature verification and graphological character profiles. The signature verification apparatus also enables an understanding of human behaviour.

Various types of transaction require the signature of a person. Thus, for example, signatures are required on cheques, credit cards and legal documents. Cheques, credit cards and the like are often stolen and attempts are frequently made to forge signatures.

Attempts to detect forged signatures have initially been done by comparing a genuine signature with a subsequently written signature which may be forged or not. Thus, for example, if a signature on a cheque is written in a bank and the bank official does not recognise the person signing the cheque, then the bank official will often check the written signature against a held original signature. The visual comparison of two signatures is not very accurate, especially bearing in mind that persons often vary their own signature slightly. Thus the visual comparison of signatures is widely agreed to be unsatisfactory, especially when done by inexperienced persons in places such as banks and shops where there is often pressure to complete transactions quickly due to other customers waiting.

The above mentioned problems of comparing visual signatures have led to the introduction of signature verification apparatus which is of an electronic nature and which depends upon the speed of execution of the signature. However, speed is one of the most variable components in all written movements, due to the fact that the speed of writing can be changed with deliberate attempt. Still further, genuine persons often change the speed of writing of their signature due to environmental pressures such for example as other people waiting in the queue or simply the person being in a hurry or not in a hurry. A multitude of other factors including physical injuries, advancing age and missing spectacles may vary the speed of writing a signature. Thus the known dynamic signature verification apparatus which relies upon "speed of execution" or is combined with "fuzzy logic" or neural networks or both combined with speed of execution, are not as accurate as they would ideally be. The existing apparatus often leads to a number of false rejections of a signature due to a genuine person unconsciously changing their speed of signature for the reason already described. Also, because the known different types of signature verification apparatus are based upon the speed of execution, they tend to give a high degree of false acceptances whereby the known apparatus accepts deliberate forged signatures by mistake.

It is an aim of the present invention to obviate or reduce the above mentioned problems.

Accordingly, the present invention provides verification apparatus comprising a writing instrument having a body and grip sensing means which is in the form of a grid and which is for sensing grip pressure patterns of a person when the person is holding the writing instrument and executing an intended movement, the verification apparatus being such that the sensed grip pressure patterns are able to be compared with stored grip pressure patterns values for the person in order to obtain information about the person executing the movement with the writing instrument.

The apparatus of the present invention is able to operate with a high degree of accuracy because it captures and measures four dimensional data relating to the person's natural hold which is less inclined to change than their speed of writing.

The apparatus of the invention enables an understanding of human behaviour which naturally occurs within all written movement of any nationality or written language whether it be signatures, handwriting, printing, characters (Chinese, Japanese or Arabic), drawings, pictures, numerals, or doodles. The apparatus of the invention may be used for a variety of purposes such for example as signature verification, forensic document examination, graphological analysis and research, education writing aids (teaching children to write, draw or paint), dyslexia diagnosis, dynamic written movement recognition (whether it be any of the aforementioned), lie detection, and medical diagnosis. The apparatus may be regarded as a measuring instrument which retains the capability of operating behavioural analysis or verification. The apparatus can be either a complete system incorporating a light controlled diode pad, digitizing pad, or TV/monitor screen. The apparatus can alternatively be a stand alone writing instrument (i.e. the writing instrument is used as normal without a pad) which calculates the required data for the required application. If the writing instrument, e.g. a pen, is used alone it may be regarded as a biometric instrument pen. If necessary, the apparatus may comprise a computer chip which is placed into an existing pad, or writing instrument.

The apparatus of the present invention may be used for a wide variety of purposes including written movements/signature verification, graphological character profiles, medical diagnosis, dyslexia diagnosis/correction, education/teaching to write, research, and dynamic handwriting recognition.

When the apparatus of the invention is used for and in a written movement signature verification mode, then the apparatus may be used for the verification of any written movement, whether it be signatures, handwriting, printing, drawings or numerals of any nationality or written language.

The apparatus of the invention may be used for research to further forensic document examination and in forensic document examination. The apparatus allows an understanding of behavioural causes of the written movement executed, i.e. the captured four dimensional data can be compared with the actual written movement captured by X, Y and Z co-ordinates and the hard copy (for example paper) itself. This allows an exact understanding of how the written movement was executed. This mode of use would provide valuable evidence in a court of law as the identity of an author responsible for a questioned document, or written movement could be more effectively identified with greater certainty. The apparatus of the invention would ensure that forensic evidence is more objective instead of being as it is today subjective expert opinion. The apparatus of the invention can retain the options of having an appropriate software, a chip or complete system. In the forensic document examination mode both behavioural and verification analysis will normally be used.

The apparatus of the invention may be used for graphological character profile research and graphological character profiles. Thus, the apparatus may capture data of a written movement, whether it be signatures, handwriting, printing, drawings, pictures or numerals of any nationality or written language. Then appropriate software or a chip is able to execute psychological profiles of the writer, author, or signatory, for example in order to determine whether or not a person is being truthful or dishonest. This mode of use of the apparatus of the invention may be useful in personnel selection or assessing the credit worthiness of individuals.

If the apparatus of the present invention is used for medical research and diagnosis, then it can be used to detect or diagnose illnesses, whether they be physiological or psychological. Also, the apparatus can diagnose different addictions such for example as to alcohol and drugs. The apparatus may be used in medical diagnosis to determine heart rate levels. This information could then be combined with other data so that, for example, heavy pressure applied and a high heart rate may indicate a high blood pressure or a high state of anxiety. With the appropriate software or chip, the captured X, Y and Z co-ordinates and four dimensional data can be used to determine the type of brainwaves and brain impulses, for example alpha, beta, delta and theta. These are achieved by translating the data into a graph format.

The apparatus of the present invention may be used in dyslexia diagnosis/correction by contributing to the understanding of writing difficulties and then enabling appropriate correction to take place. The apparatus may also allow the person suffering from dyslexia to communicate more easily and execute a better life.

Where the apparatus of the invention is used for education/teaching to write, then the apparatus may be used with complementary software or a chip in order to enable children to write properly. Also, the apparatus may be combined with existing educational practices.

The apparatus of the invention can also be used in research in order to contribute in the gathering of accurate movement and statistics. Thus, for example, one thousand criminal writings/written movements would reveal common denominators of the written movements gathered.

If the apparatus of the invention is used for dynamic handwriting recognition, then it may allow automatic handwriting recognition without the need for a software operator to be trained as in existing apparatus, or without the need of the user having to train the apparatus as to the meaning of his or her unique style of written movement, i.e. the user having to input his/her own alphabet before the apparatus is fully operational or recognises his/her alphabet written movement. The apparatus of the invention with the appropriate software or chip will be able to monitor X, Y and Z co-ordinates with the amplification of the movement that takes place at the top of the writing instrument.

The apparatus of the invention can be used to verify any written type of movement. This cannot be done with existing known types of signature verification apparatus. The signatures or written information may be on cheques, credit cards, legal documents, medical documents, insurance documents, construction plans, health and safety documents, and data protection documents. The apparatus of the present invention may be used for enforcing accountability and in a wide variety of applications such as smart cards for use in identification purposes, medical purposes, banking purposes, insurance purposes and government agencies such as benefits agencies, Inland Revenue, Customs and Excise, driving licence agencies and national identity card agencies. The apparatus of the invention may also be used in applications which do not require the use of a smart card, examples of such applications being terminal security, door entry systems, secure telecommunications systems, and the movement of goods within a building or country to country. Thus the terminal itself may retain the information to verify the identity of a person without having to use a smart card.

The apparatus of the invention may include an additional trembler switch to detect shakiness or nervousness. The apparatus may also include a sensitive microphone to pick up the heart beat rate from the thumb. Rather than rely on traditional graphological signs of dishonesty, the apparatus of the invention may be used, for example, for crime suspects to answer specific written questions in writing to determine whether or not they are telling the truth.

The apparatus of the invention may be one in which the grip sensing means also senses applied grip pressure, and in which the sensed applied grip pressure is compared with a stored applied grip pressure value for the person in order to obtain the information about the person executing the movement with the writing instrument.

The grip sensing means may be a grip sensing sleeve or pad made of an electrically conducting material. The electrically conducting material may be graphite, a conductive grid around the writing instrument barrel, a digitized grip around the writing instrument barrel, heat sensitive material which can tell the area of the grip pressure patterns, electrical plastic or material which allows detection of where resistance is being applied, or any other suitable and appropriate conducting, resistive, or heat material. If desired, light sources could be used to detect grip pressure. Light sources may alternatively be used which employ the principles of scanning technology. It is possible to scan finger prints placed upon the writing instrument. Also, if desired, the grip sensing means may operate using electromagnetism and magnetic fields. Touch sensors can be used.

The writing instrument includes writing pressure sensing means which is in the form of a grid and which is for sensing the writing pressure applied by a person through the writing instrument on to a surface when the person is holding a writing instrument and executing the intended movement, the apparatus being such that the sensed writing pressure is able to be compared with a stored writing pressure value for the person in order to obtain information about the person executing the movement with the writing instrument A spring or springs of any type may be used instead of using a graphite rubber. Alternatively, the spring or springs may be used in conjunction with graphite rubber to determine the actual pressure applied.

The writing instrument may include angle pressure sensing means for sensing the pressure of the writing instrument against the person's hand as the writing instrument is held at an angle during the execution of the movement, and the apparatus being such that the sensed angle pressure is able to be compared with a stored angle pressure value for the person in order to obtain information about the person executing the movement with the writing instrument.

If desired, touch sensors may be used. The measurements may rely on measuring the distance taken from a nib or point of the writing instrument, the same as in grip pressure patterns.

Any suitable and appropriate angle pressure means may be employed. Thus, for example, the same techniques as described above for the grip sensing device may be employed.

The writing instrument includes gyroscope means for sensing how the writing instrument is moved when the person is holding the writing instrument and is executing the intended movement, and the apparatus being such that the sensed writing instrument movement is able to be compared with a stored writing instrument movement value for the person in order to obtain information about the person executing the intended movement with the writing instrument.

The gyroscope means determines the position of the top of pen in order that the appropriate software can calculate the X, Y and Z co-ordinates, longitude and latitude, and correlation.

Accelerometers can be added into the pen to determine speed (velocity), acceleration, deacceleration and constant speed. These values can be stored to provide evidence, or used in research. The values do not necessarily have to be used in verification.

The apparatus of the invention may include pad means for being written on, whether it be by digitizing or by light controlled diode. If necessary, the apparatus can be employed to operate on computer monitors or TV screens. Of course, the appropriate software or chip would apply.

Any suitable and appropriate type of pad means may be employed. Thus, for example, the pad means may be a movable pad means or a fixed pad means.

When the pad means is a movable pad means, then the apparatus of the invention will normally include the same principle as a mouse (roller ball) to determine how and where the pad is moved to instead of using a gyroscope. Indeed, two or more roller balls could be used to determine accurately how the pad was moved.

The pad can be designed to imitate a slope of a school desk. This ensures that the hand and the arm are free without actually impeding the writing surface, and would ensure that the person would always be able to see what they intended to execute. With a sloping surface left handers would not have to bend their wrist right round and come in from the top. Left handers would be able to write normally. Appropriate software or chip would be needed.

Also, a normal flat pad could be embedded in a polystyrene surround. This would ensure that the wrist would not be at a different angle if the hand and arm were lying or placed upon a flat surface. The polystyrene surround would ensure that the hand and arm were always flat upon the surface and stop the person from cocking their wrist or raising their arm. Thus, their execution of written movement would be normal. If necessary, a hollow table could be used which the pad sits into. This ensures the arm and the hand would be flat with the writing surface.

In the case of research, the apparatus of the invention could incorporate a glove into which a person inserts their hand. This glove would be able to determine how much pressure the fingers applied to the writing instrument, actual finger manipulation, hand size, hand roll, hand yawn and hand pitch. This data could be correlated with the gyroscopic movements and X, Y and Z co-ordinates.

The apparatus of the invention may be one in which the or each stored value is stored in memory means remote from the writing instrument. Thus, for example, the or each stored value may be stored in a main computer which can be down loaded as necessary or as instructed, for example to the pad means. Details of an original executed movement, for example a signature, may be such that they are only called up it an executed movement is disputed. Otherwise, comparator means can effect the comparison between the stored electronic details of the genuine executed movement and the electronic details of the executed movement just written.

Advantageously, the apparatus of the invention includes retaining means for retaining the executed movement just written by the person writing the executed movement. Such retained information may be useful for providing evidence in court, for example in a case where a person signing their signature is charged with fraud. The retaining means may be a separate memory or it may form part of the memory containing the details of the original executed movement.

The writing instrument will usually be in the form of a pen and, more especially, the writing instrument will usually be in the form of a biro having a ball tip. The ball tip is preferably 1mm in diameter but other sizes of ball tips may be employed. Also, other types of writing instruments including pencils and electronic writing instruments may be employed.

The pen can be in various forms. A more expensive pen would retain all the components and all the appropriate software or chips for the required applications. There may be cheaper versions which may retain one or two of the components. For example, a writing instrument used with a pad that gives off a low frequency electromagnetic field could in effect do without the gyroscope as the longitude and latitude movement could be calculated by monitoring the disturbances that occur in the electromagnetic field. Also, the pen can be stand alone and operate the necessary calculations without the pad being used at all. The writing instrument would retain a chip which calculates the necessary functions and movements which would then be relayed by infra-red signals or by other transmitting means to the computer terminal. In this sense the biometric instrument pen would be seen and used as a normal pen.

Embodiments of the invention will now be described solely by way of example and with reference to the accompanying drawings in which.

Figure 1:
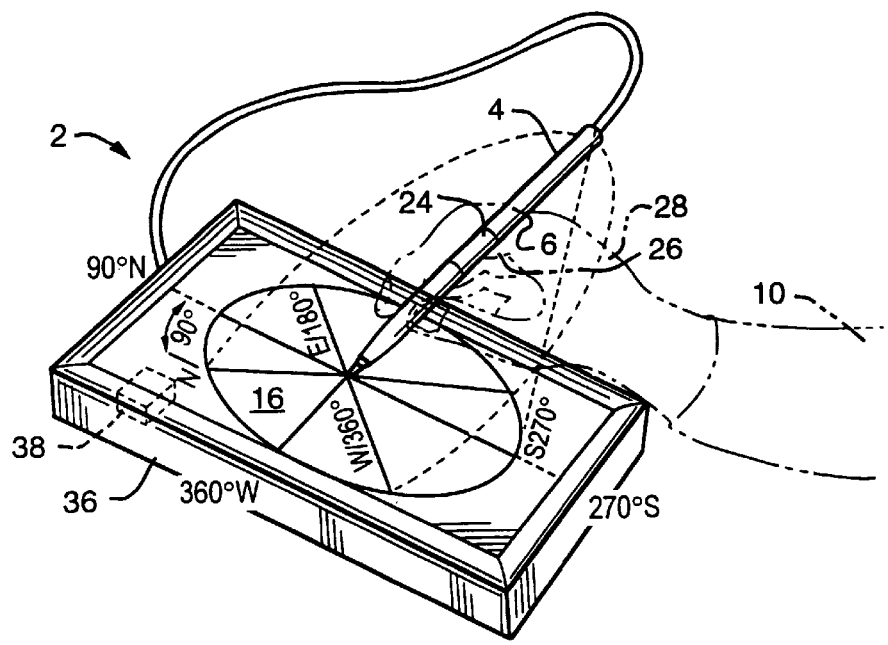
FIG. 1 is a perspective view of signature verification apparatus.
Figure 2:
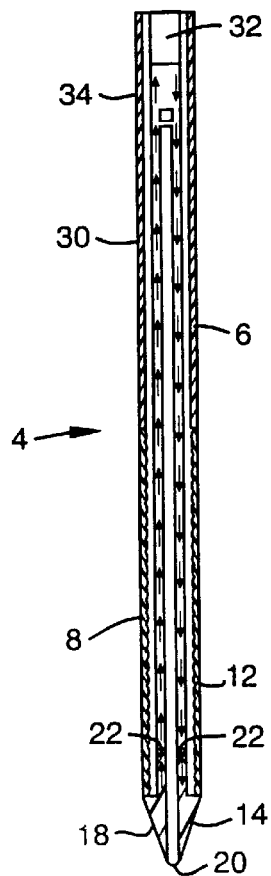
FIG. 2 is a cross section through a writing instrument employed in the apparatus shown in FIG. 1.

Referring to FIGS. 1 and 2, there is shown verification apparatus in the form of signature verification apparatus 2. The apparatus 2 comprises a writing instrument 4 having a body 6 and grip sensing means 8 for sensing the grip pressure patterns and the applied grip pressure of a person 10 when the person 10 is holding the writing instrument 4 as shown and writing their signature. The apparatus 2 is such that the sensed grip pressure patterns and grip pressure are able to be compared with stored grip pressure patterns values and a grip pressure value for the person 10 in order to verify that the person 10 writing the signature with the writing instrument 4 is the correct person. The stored grip pressure patterns values and the stored grip pressure value may be stored in memory means remote from the apparatus 2, for example in the head office of a bank. This information may be then called up as necessary to a sub-memory means (not shown) provided in the signature verification apparatus shown in FIG. 1.

The grip sensing means 8 comprises a grip sensing sleeve 12 which is positioned on the body 6 as shown over a length of the body 6 that will be gripped by the person 10 writing with the writing instrument 4. The grip sensing sleeve 12 is made of an electrically conducting material in the form of graphite.

The writing instrument 4 includes writing pressure sensing means 14 for sensing the writing pressure applied by the person 10 through the writing instrument 4 on to a surface 16 when the person 10 is holding the writing instrument 4 and writing their signature. The apparatus 2 is such that the sensed writing pressure is able to be compared with a stored writing pressure value for the person 10 in order to verify that the person 10 writing their signature with the writing instrument 4 is the correct person 10.

The writing pressure sensing means 14 is formed as a tip part 18 of the writing instrument. The tip part 18 has a 1mm ball point 20 which is connected to a pair of sensors 22. The tip part 18 is made of an electrically conducting material in the form of graphite.

The writing instrument further includes angle pressure sensing means 24 for sensing the pressure of the writing instrument 4 against a part 26 of the person's hand 28 as the writing instrument 4 is held at an angle as shown during the writing of a person's signature. The apparatus 2 is such that the sensed angle pressure is able to be compared with a stored angle pressure value for the person in order to verify 19 that the person writing the signature with the writing instrument is the correct person. The angle pressure sensing means 24 is one or more touch sensors 30 positioned as shown on the body 6 over a length of the body 6 that will rest against the part 26 and surrounding parts of the person's hand 28 during writing with the writing instrument 4. The or each touch sensor 30 may be made of a plastics material.

The writing instrument may include gyroscope means 32 for sensing how the writing instrument is moved through longitude and latitude when the person 10 is holding the writing instrument 4 and writing their signature. The apparatus 2 is such that the sensed writing instrument movement is able to be compared with a stored writing instrument movement value for the person 10 in order to verify that the person 10 writing the signature with the writing instrument is the correct person.

As can be seen from FIG. 2, the gyroscope means 32 is positioned at an end 34 of the writing instrument 4 remote from the writing end having the ball point 20. The gyroscope means 32 is a solid state gyroscope and it is able to give longitude and latitude measurements and to correlate these measurements with X, Y and Z coordinates.

The stored writing pressure value, the stored angle pressure value and the stored writing movement value are all stored with the stored grip pressure patterns values and the grip pressure value.

Figure 3:
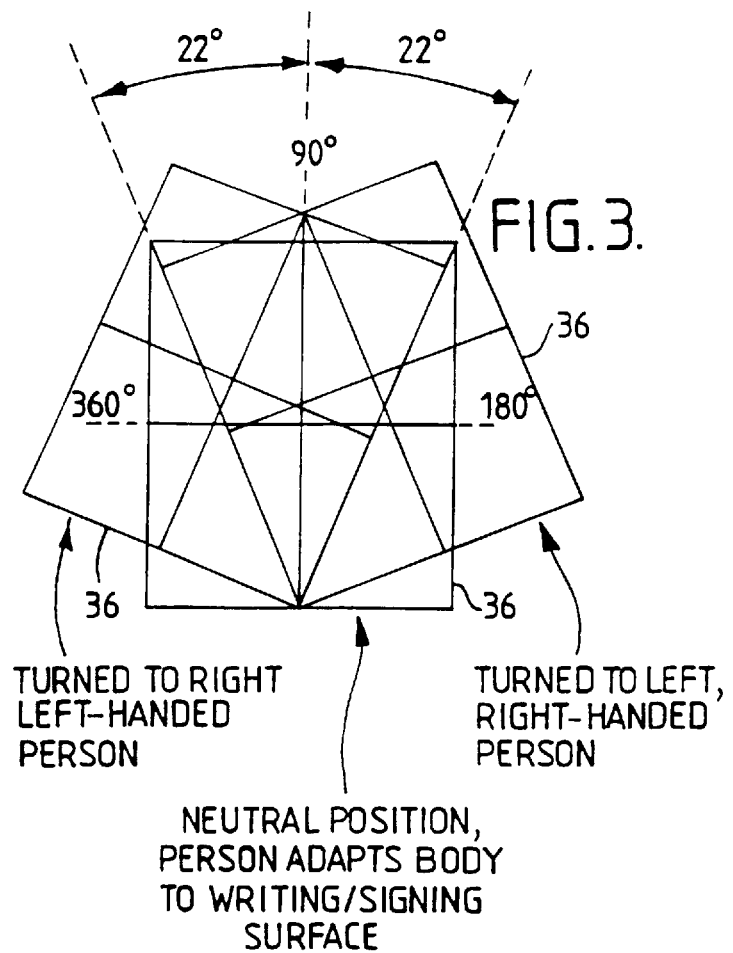
FIG. 3 shows how pad means forming part of the apparatus shown in FIG. 1 can be moved.

The apparatus 2 includes pad means 36 for being written on. The pad means 36 has the surface 16. The pad means 36 is a movable pad means and FIG. 3 shows how the pad means 36 may be moved.

The pad means 36 includes gyroscope means 38 for sensing if and when the pad means 36 is moved by the person 10 writing their signature. The apparatus 2 is such that the sensed pad means movement is able to be compared with a stored pad means movement value for the person 10 in order to verify that the person 10 writing their signature with the writing instrument 4 is the correct person. The stored pad means movement value is stored with the other stored values obtained from the writing instrument 4.

The apparatus 2 shown in FIG. 1 includes retaining means (not shown) for retaining the signature just written by the person 10 signing their signature. The electronic details of this written signature can then be used in, for example, court proceedings in cases of fraud where the person is being accused of fraudulently writing somebody else's signature.

Referring again to FIG. 3, it will be seen that the gyroscope means 38 is able to indicate whether the pad means 36 is being turned to the right by a left handed person, is being turned to the left by a right handed person, or is being left in a neutral position by a person who adapts their body to the presented writing surface 16.

Figure 4:
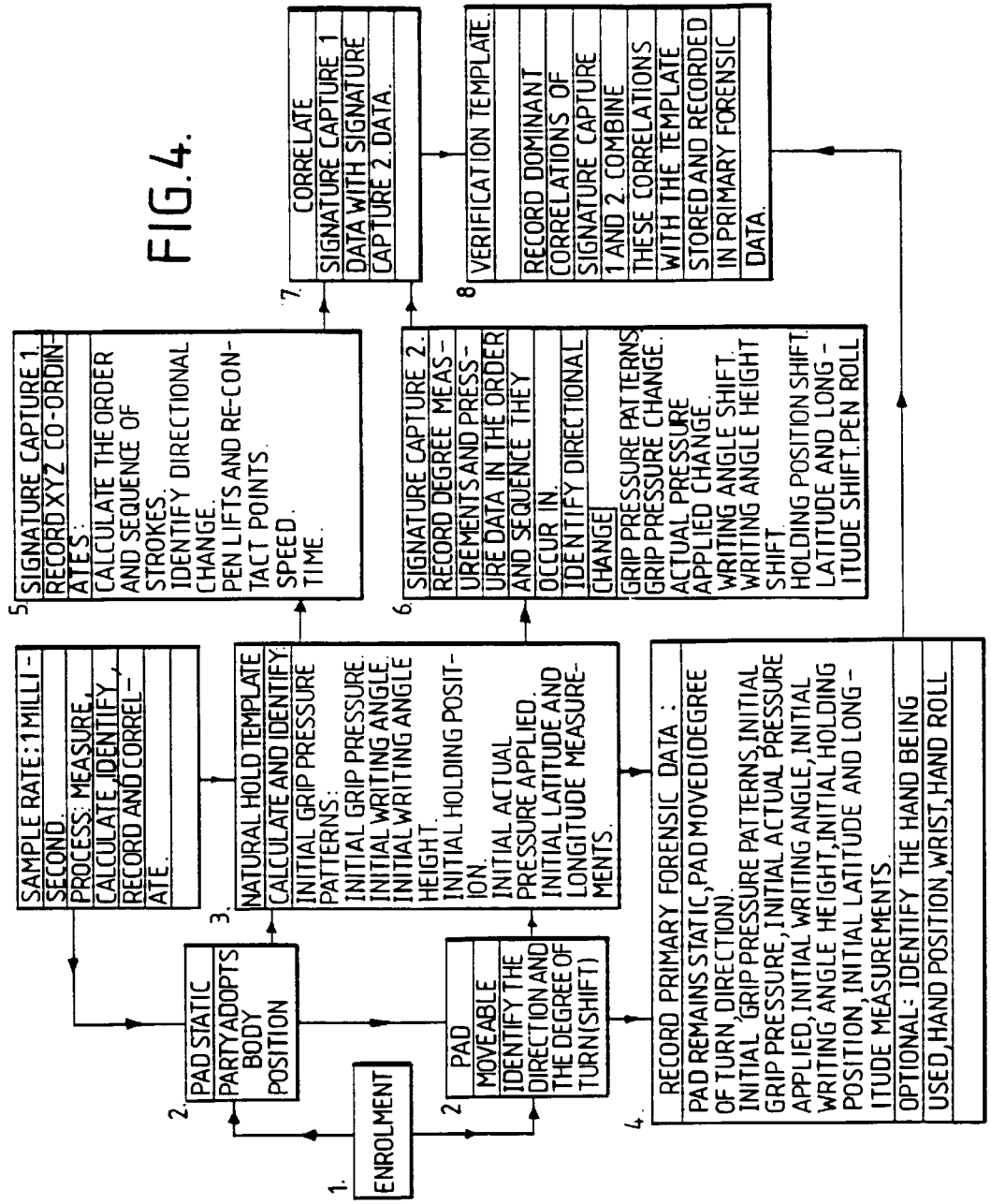
FIG. 4 is a block schematic diagram showing the electronic sequence of events carried out by the apparatus shown in FIG. 1.

Referring now to FIG. 4, there is shown in block diagramatic form, the sequence of electronic events that is carried out by the apparatus 2. Each of the various steps are set out and FIG. 4 is thus self-explanatory.

It is to be appreciated that the embodiments of the invention described with reference to the accompanying drawings have been given by way of example only and that modifications may be effected. Thus, for example, other types of grip sensing means 8, writing pressure sensing means 14 and angle pressure sensing means 24 may be employed. If desired, the writing instrument may be provided with heart beat sensor means for measuring the heart beat of the person using the writing instrument 4 through their thumb. An increased heart beat may then be indicative of a fraud being conducted or a lie being given.

The apparatus 2 can be operated such that the X, Y and Z co-ordinates are captured by a liquid crystal display pad means 36 or a digitizing pad means 36. The surface of the pad means may be divided into 1,000 by 1,000 lines. As the writing instrument 4 is moved through these lines, the co-ordinates are captured along with the signature. Thus, by reproducing the X, Y and Z co-ordinates, a signature can be reformed and printed out.

The apparatus 2 can work without the pad means 36 because it is possible to execute the verification with the writing instrument 4 alone. The writing instrument 4 can be detached from the pad means 36 and the measurements relayed by an infra-red signal. In this case, the pad means 36 would not have a gyroscope at all, and the writing instrument 4 would execute the necessary calculations, and relay the calculations for a computer terminal to execute verification.

When the writing instrument 4 touches the screen/writing surface (i.e. the moment contact is made) it is necessary first of all to establish the trigonometry of the natural hold. The trigonometry of the natural hold will always incorporate a "right-angled triangle" regardless of the hand being used. Thus, the first step is to identify the writing angle of the pen (pen tilt or the hypotenuse in trigonometry), which is measured in degrees or X, Y and Z co-ordinates. Once the writing angle has been determined, it is necessary to determine the writing angle height (height of the pen tilt from the surface or in trigonometry terms the height of the opposite side). To calculate the writing angle height, the trigonometry equation of L×Sin A is used (L=the length of the pen). This measurement can then be measured in millimetres or a half millimetre scale if necessary. With these two measurements completed, it is then necessary to determine the base of the "right-angled triangle" (the adjacent side in trigonometry terms) to what may be referred to as the holding position. To determine the holding position, the trigonomic equation of L×Cos A is used. This measurement can then be measured in millimetres or in a half millimetre scale. Once the calculations of the above have been executed, the full trigonometry of the "right-angled triangle" (the natural hold) will be known.

After determining the trigonometry in the natural hold, the next stage is to project a 360° circle around the writing instrument. This measurement is determined by taking the holding position's length as this is equal to the radius of the circle projected around the writing instrument (i.e. L×Cos A=Radius of Circle. If the writing instrument is flat upon the writing surface, the writing instrument's length=the radius of the 360° circle). The projected circle is then divided into four quadrants upon a north-south and west-east basis. These measurements can be simultaneously determined with the trigonometry of the natural hold. In fact, as trigonometry involves constant numbers, the process could be aided by pre-determined tables stored in the apparatus or terminal, i.e. once the writing angle is known this measurement is compared with the stored tables to determine the rest of the trigonometry, the radius of the circle, the size of the circle and the four quadrants of the circle. Again, these calculations are taken the moment the writing instrument touches the screen or other appropriate surface.

Once the calculations of the trigonometry and of the circle have taKen place, a theoretical 360° dome is projected over the 360° circle. Again, the writing instrument length equals the height of the dome. Once the dome is projected around or over the 360° circle, the gyroscopic means 32 at the top of the writing instrument 4 gives a precise longitude and latitude measurement as to the precise location of the writing instrument 4 within the 360° dome. This measurement is then taken to establish what quadrant the writing instrument is in of the 360° circle. Once the quadrant is determined, the position of the writing instrument can also be read from the 360° circle, as this would represent the longitude position e.g. a 220° measurement from the 360° circle represents an East longitude position. The same applies to the writing angle of the writing instrument as this would give a latitude position, e.g. a writing instrument held vertically (90°) is zero latitude. Thus, all of the aforementioned measurements described so far verify each other and will allow exact determination to establish that the measurements taken are correct. Again, it is possible to aid these calculations by pre-determined tables stored in the apparatus or in the required terminal.

Again, the moment the writing instrument makes contact/touches the writing surface or screen, simultaneous measurements of the length of hold, the grip pressure patterns upon the writing instrument, the angled pressure/touch sensored area and the area of the grip pressure patterns are taken. If desired, the scanned finger print patterns can also be taken. The length of the hold and the angled pressure/contact (touched) area is measured and determined in millimetres or on a half millimetre scale. The area involved in the grip pressure patterns is calculated by using conventional mathematics. Again, these measurements can be aided by pre-determined tables stored in the apparatus or in the terminal. Also, as the thumb will always be the largest area upon the writing instrument, by determining which side of the writing instrument the thumb is on will enable the determination of the hand being used.

If desired, pre-determined tables/values could be stored in a smart card and the individual would be unaware of what these values were. If a neural network is used in conjunction with a smart card, the four dimensional trend of the individual's natural hold could be identified and upgraded with each written movement the individual cares to execute. In fact, by using this four dimensional approach the individual, when executing a series of written movements for a correlation template, will be forming his or her own unique code which the individual will be unaware of. Thus, once the unique code is stored in the apparatus, computer terminal or in a smart card, a correlation of codes can take place with each new written movement the individual cares to execute.

There are several ways of achieving the latter mathematical calculations so that, for example, it is possible to project the 360° dome first, locate the precise position of the writing instrument within the 3600 dome by using longitude and latitude measurements, and then calculate the trigonometry of the writing angle, the writing angle height, the holding position and the radius of the 360° circle.

As for actual pressure applied upon the writing surface, the actual pressure applied upon the writing instrument (grip pressure) and speed (acceleration, deacceleration, velocity and constant speed), these could be used in the verification process of the apparatus. However, the latter values are variables (i.e. the individual can change these with deliberate intent, by mistake, moods, etc.) and are the cause of false rejections and false acceptances. If variables are catered for by setting tolerances like other dynamic signature verification manufacturers have done, two things happen. Firstly, the tolerance will become too wide which will allow false acceptances to occur and secondly if the tolerances are too narrow false rejections will occur. Even if "fuzzy logic" or "character correlation" is used, the two things will still occur, because no two signatures or written movements executed are the same. Also, by using variables in verification, it may result in the user having to execute their intended written movement several times to get their own signature accepted. Therefore, the latter variables will be far more effective if they are captured and used in forensic analysis to ascert responsibility of a signature or written movement upon an individual in a court of law.

The apparatus of the present invention provides a solution to the challenges involved in verification and it is also able to provide a formidable amount of forensic evidence which until now has never been available. The apparatus may allow determination of the hand roll, hand yawn, hand pitch, the degree of finger, arm and wrist manipulation, the hand being used and the size of the hand. The apparatus may capture all available data in real time and everything there is to know about the individual and the written movement executed. The apparatus not only provides greater accuracy in proving "due proof of execution" but also enables the burden of proof to be discharged more effectively.

The mathematical calculations that need to be done can be done by a chip or other microprocessor if desired, The elements that make hold identifiable are as follows:

(a) The position of the pad means 36 (if used or moved).

(b) The number of grip pressure patterns and their individual areas.

(c) The distance of the grip pressure patterns from the ball point 20.

(d) The angle pressure (where the writing instrument 4 is laid in the hand).

(e) The 360° circle projected around the writing instrument 4.

(f) Trigonometry of the hold.

(g) The longitude and latitude measurements within the 360° dome.

The trigonometry involved in the hold, i.e. the writing angle, the writing angle height, the holding position, the longitude and the latitude, can be calculated by magnetic field. This process involving a 360° degree circle, i.e. the moment the writing instrument touches the surface, can be placed in a chip which is reliant upon calculating movement or disturbances in the magnetic field which is naturally given off by the apparatus. Not all of the above elements have to be used together. If desired, a cheaper version could use one or two of the elements only.

The apparatus of the invention may use electronic locating devices. For example, a magnetic sensor may be employed in each of the four corners of a pad. If a magnetic sensor is installed in the writing instrument, this would allow the magnetic field disturbance to be calculated and the location of the writing instrument to be established within the four quadrants of a 360° circle, and the longitude and latitude measurements. This method utilises the "Hall" effect and it relies upon transistors or a group of transistors being installed into the writing instrument. Basically, both points of the writing instrument, for example the nib and the top of a pen, are identified and then calculated using trigonometry to establish the necessary measurements.

Figure 5:
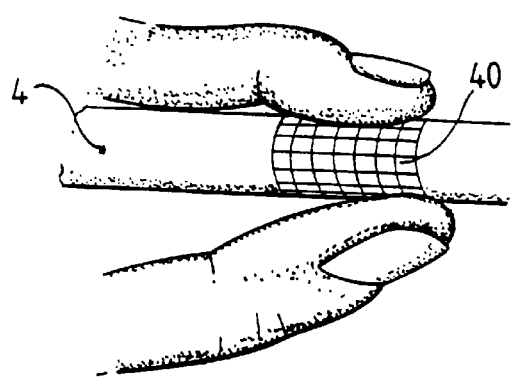
FIG. 5 is a side view of a conductive grid part of a writing instrument being gripped.
Figure 6:
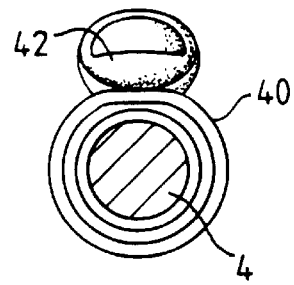
FIG. 6 is an end view of a conductive grid part of a writing instrument being gripped with a light pressure.
Figure 7:
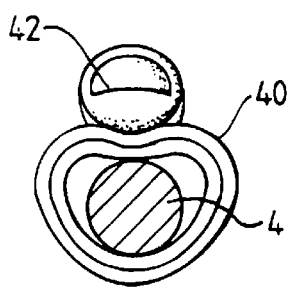
FIG. 7 is an end view of the part of the writing instrument shown in FIG. 6 but being gripped with a heavy pressure.

If a conductive grid that wraps around the writing instruments is employed, then this grid may be several layers deep, thus becoming a more effective pressure pad. This embodiment of the invention is illustrated in FIGS. 5, 6 and 7. In FIG. 5 there is shown part of a writing instrument 4 having a conductive grid 40. FIG. 6 shows the writing instrument 4 and how the conductive grid 40 is several layers deep around the writing instrument 4. A thumb 42 is shown pressing on the conductive grid 40 with a light pressure. It will be seen that the conductive grid 40 is not deformed. In FIG. 7, the thumb 42 is shown pressing on the conductive grid 40 with a hard pressure. It will be seen that the conductive grid 40 has been deformed. The finer the conductive grid, the greater the resolution.

Figure 8:
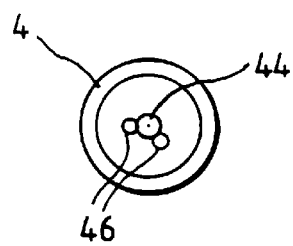
FIG. 8 is a top view of part of a writing instrument employing roller balls as a computer mouse.
Figure 9:
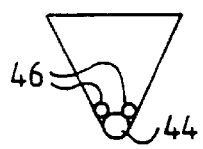
FIG. 9 is a side view of the part of the writing instrument shown in FIG. 8.

FIGS. 8 and 9 show a writing instrument 4 having a 1mm nib 44 and two roller balls 46. The roller balls 46 are contacted by appropriate wires, electrical contacts or sensor (not shown). The roller balls 46 are hidden away inside the housing of the pen 4 adjacent the nib 44. The housing may be made of graphite, rubber or conductive plastics material or any other suitable and appropriate material. The arrangement shown in FIGS. 8 and 9 enables a totally free standing writing instrument to execute its own calculation as to the direction it would be travelling in. A pad would not be needed and the writing instrument 4 would be used as a normal writing instrument. In an alternative embodiment of the invention, light infra-red sensors may be used. In either embodiment of the invention, the remainder of the writing instrument may be as described above so that, for example, the writing instrument may include a spring and a gyroscope.

The use of a gyroscope is not essential to the apparatus of the invention. The gyroscope may be omitted and then just trigonometry functions used with grip pressure patterns, or the trigonometry functions by themselves. The gyroscope increases the accuracy of the longitude and latitude measurements. The gyroscope calculations (longitude and latitude) can be calculated by diagnosing the disturbances of the magnetic field. The disturbance measurements may be taken at the writing end of the writing instrument or at the top end of the writing instrument. Where the disturbance measurements are taken may depend upon how powerful the magnetic field is.

The apparatus of the invention has many applications as will be apparent from the above. The law and in particular evidential law, requires that as much proof as possible be obtained to place before a court due proof of execution of a party responsible. Because the apparatus of the present invention is able to gather four dimensional data, it is able to provide greater proof than current signature verification systems which are based upon speed of execution and fuzzy logic, i.e. capturing written movements and comparing the characteristics against each other. The apparatus of the present invention will execute these functions but with a significant difference insofar as it is able to capture data which is four dimensional. The legal dilemma which other signature systems face is that, should a forger manage to forge another party's signature, the mathematical models between the two will be same with no way of identifying the party responsible. The apparatus of the present invention does not have this problem because it is able to make use of the trigonometric functions, and longitude and latitude measurements.

Figure 10:
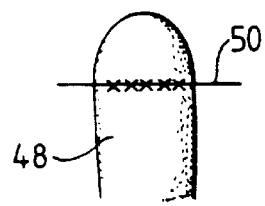
FIG. 10 illustrates optical scanning.

If desired, the apparatus of the present invention may be such that a microphone replaces the grip pressure sensing means on the writing instrument. The writing instrument may then become a lie detector. If desired, the microphone may be used in conjunction with a trembler switch to detect, for example, nervousness.

Where the apparatus of the invention uses grip sensing means, then the grip sensing means may be used to scan a finger print by an optical method as illustrated in FIG. 10. FIG. 10 shows a finger or thumb 48 being scanned by an optical beam 50. The optical beam 50 scans in a straight line, recording points along that line. This optical detection method may be employed to give data on an area under consideration.

Figure 11:
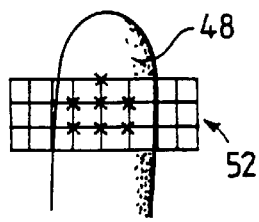
FIGS. 11 and 12 illustrate grid scanning.
Figure 12:
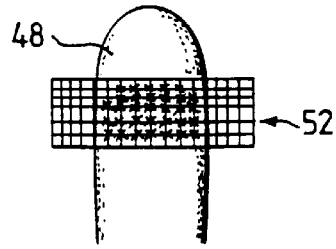

FIGS. 11 and 12 show the use of grip sensing means which employs pressure scanning. As can be seen from a comparison of FIGS. 11 and 12, the grid 52 in FIG. 12 is more dense than the grid 52 in FIG. 11. Thus the grid 52 of FIG. 12 gives higher resolution pressure scanning than the grid 52 shown in FIG. 11. The grid 52 may be used to identify the grip pressure area, the pressure applied to the writing instrument, and the scanning of a finger/thumb print or pores. The grids 52 may be conductive or touch sensitive.

Figure 13:
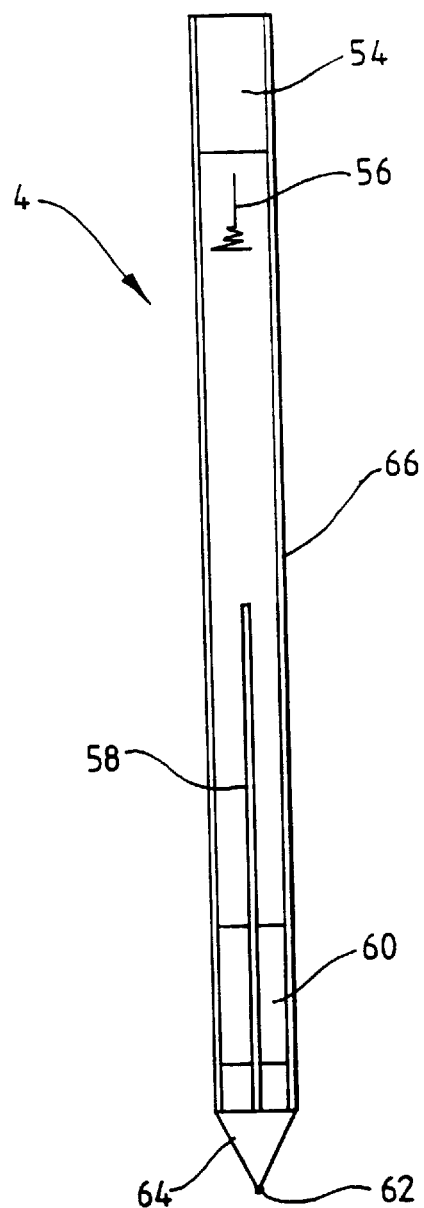
FIG. 13 shows apparatus of the invention in the form of a writing instrument with a gyroscope and a microphone.

Referring now to FIG. 13, there is shown a writing instrument 4 having a gyroscope 54, a trembler switch 56, an ink tube 58 and a powerful microphone 60. The writing instrument 4 also has a 1 mm ball point 62 and a conductive graphite rubber tip 64. The writing instrument 4 has a conductive plastics barrel 66. A fine high resolution grid (not shown) surrounds the area of the microphone 60.

If desired, the microphone 60 can replace the grip sensing means altogether so that the microphone 60 lays next to the user's skin. This enables the determination of grip pressure areas or pressure applied.

The microphone 60 can be embodied into the writing instrument, for example the illustrated ball point pen, and covered with conductive graphite rubber. This will allow a user's heart beat to be picked up, and will also provide data on the area of grip pressure and the amount of pressure applied.

If the microphone 60 is embodied into the writing instrument 4 behind a thin conductive plastics wall which retains a very high resolution grid, then the heart beat, the grid pressure area, the pressure applied and the scanning of the finger print/thumb print or pores can be achieved. The embodiment of the apparatus of the invention shown in FIG. 13 can be used as a lie detector.

I claim:

1. Verification apparatus comprising a writing instrument having in combination:
    (i) a body;
    (ii) grip sensing and recording means which during a period of an intended movement with the writing instrument by a person senses all points of contact with the writing instrument by the person holding it by a sensitive sleeve that identifies the points of contact by reference to a grid on the sleeve and measures pressure of the contact and variations of the contact and pressure, captures measured data, and compares the captured data with previously recorded data;
    (iii) writing pressure sensing and recording means which during the period of the intended movement senses contact between the writing instrument and a writing surface and measures pressure of the contact, captures measured data, and compares the captured data with previously recorded data; and (iv) gyroscope position sensing and recording means which during the period of the intended movement senses movement of the writing instrument relative to a writing tip of the writing instrument and variations thereof, correlates a pattern of the movement and the variations thereof with positional coordinates by reference to a semisphere projected over a base circle, the centre of which is a first point of contact of the writing instrument with the writing surface, captures data recording the pattern of the movement and the variations thereof, and compares the captured data with previously recorded data.

2. Verification apparatus according to claim 1 and comprising a writing pad position and movement sensing means which during the course of the intended movement senses movement of a writing pad and variations thereof, correlates a pattern of the writing pad movement and variations thereof, captures data recording the pattern for the writing movement, and compares the captured data with previously recorded data.

3. Verification apparatus according to claim 1 in which the gyroscope means is positioned at an end of the writing instrument remote from the writing end.

4. Verification apparatus according to claim 1 and including retaining means for retaining the executed movement just written by the person writing the intended movement.

* * * * *